(12) United States Patent
Winkler et al.

(10) Patent No.: US 8,444,764 B2
(45) Date of Patent: May 21, 2013

(54) SETTING RETARDER FOR HYDRAULICALLY SETTING COMPOSITIONS

(75) Inventors: Maria Winkler, Babenhausen (DE); Franz Etschmann, Illertissen (DE)

(73) Assignee: Sika Technology AG, Baar (CH)

( * ) Notice: Subject to any disclaimer, the term of this patent is extended or adjusted under 35 U.S.C. 154(b) by 73 days.

(21) Appl. No.: 12/934,368

(22) PCT Filed: Apr. 9, 2009

(86) PCT No.: PCT/EP2009/054284
§ 371 (c)(1),
(2), (4) Date: Sep. 24, 2010

(87) PCT Pub. No.: WO2009/124993
PCT Pub. Date: Oct. 15, 2009

(65) Prior Publication Data
US 2011/0056409 A1 Mar. 10, 2011

(30) Foreign Application Priority Data
Apr. 10, 2008 (EP) .................................... 08007106

(51) Int. Cl.
*C04B 11/00* (2006.01)

(52) U.S. Cl.
USPC ............................. 106/778; 106/106; 106/772

(58) Field of Classification Search
USPC ................................. 106/772, 778
See application file for complete search history.

(56) References Cited

U.S. PATENT DOCUMENTS

| | | | |
|---|---|---|---|
| 5,527,959 | A | 6/1996 | Berglund et al. |
| 6,190,451 | B1 | 2/2001 | Soya et al. |
| 6,221,967 | B1 | 4/2001 | Rodriguez et al. |
| 2006/0288910 | A1 | 12/2006 | Santra et al. |

FOREIGN PATENT DOCUMENTS

| | | |
|---|---|---|
| DE | 752 194 | 3/1953 |
| DE | 2 325 738 | 12/1974 |
| DE | 195 34 847 A1 | 3/1997 |
| DE | 197 40 787 A1 | 3/1999 |
| DE | 199 14 367 A1 | 10/1999 |
| JP | A-8-169741 | 7/1996 |
| JP | A-2000-103659 | 4/2000 |
| JP | A-2001-130936 | 5/2001 |
| JP | A-2001-261395 | 9/2001 |
| WO | WO 92/16463 | 10/1992 |

OTHER PUBLICATIONS

International Search Report dated Jul. 22, 2009 in International Patent Application No. PCT/EP2009/054284.
International Preliminary Report on Patentability dated Nov. 9, 2010 in International Patent Application No. PCT/EP2009/054284.
Ruffer, "Das Gipsabbinden: Beschleunigung und Verzogerung,"*Keramische Zeitschrift*, vol. 39, No. 1, pp. 13-15, 1987.
Fischer et al., "Hydrationsverhalten von Gipsmischungen,"*Stuck Putz Trockenbau*, pp. 16, 18, 21 and 22, 1994.
Staffel et al., "Untersuchung des Abbindeverhaltens von Zementmischungen mit der Ultraschal-methode bei Einsatz verschiedener Verzögereradditive," *Con-Chem Journal*, No. 4, pp. 93-95, 1996.
Müller, "Einfluβ von Aminoverbindungen auf das Erstarren und Erhärten von Portlandzement,"*Zement-Kaik-Gips*, vol. 27, No. 2, pp. 69-74, 1974.
Sep. 4, 2012 Japanese Office Action issued in JP-A-2011-503448 (with English-language Translation).

*Primary Examiner* — Paul Marcantoni
(74) *Attorney, Agent, or Firm* — Oliff & Berridge, PLC (57) ABSTRACT

The present invention relates to a setting retarder for compounds that set hydraulically, containing at least one at least simple adduct and/or condensate, the retarder being produced by the reaction of at least one protein hydrolysate, one pure amino acid, amino acid mixture, and/or the hydrochlorides thereof having at least one mono-, di-, oligo- and/or polycarboxylic acid which is not derived from an amino acid, and/or a carboxylic acid derivative derived therefrom, wherein the carboxylic acid is selected from a group including carboxylic acid anhydrides, carboxylic acid halogenides, and/or carboxylic acid active esters.

15 Claims, 6 Drawing Sheets

SETTING RETARDER FOR HYDRAULICALLY SETTING COMPOSITIONS

TECHNICAL FIELD

The present invention relates to a setting retarder for hydraulically setting compositions, a process for preparing it and also to uses of the setting retarder. The setting retarder according to the invention displays excellent retarding action in many hydraulically setting compositions.

PRIOR ART

In the building industry and in sculpture, large amounts of gypsum plaster compositions are used. Here, calcined gypsum or plaster of Paris is widely used either alone or in admixture with lime, sand and lightweight aggregates such as perlite or cellulose derivatives. However, the setting time of the gypsum plaster compositions after mixing with water is relatively short, so that quick processing is necessary. An overview of this subject is given, for example, by Ruffer in Keram. Ztg. 39(1), 13-15 (1987).

Retarders which have hitherto been available on the market are, for example, Retardan (polymer), phosphates, phosphonates, phosphonic acids, fruit acids (e.g. malic acid, tartaric acid, citric acid), complexing agents, gelatins, protein hydrolyzates.

In the past, there has been no lack of attempts to increase the open time in the processing of gypsum plaster by addition of suitable additives. Thus, for example, it has been proposed in DE-A 23 25 738 (Henkel) that water-soluble polymers based on unsaturated dicarboxylic acids be added to the gypsum plaster compositions. Furthermore, basic condensation products of aliphatic amino acids with formaldehyde are known for this purpose from the patent text DE-C 75 21 94 (BASF). Furthermore, Müller in Zem. K. Gips 27(2), 69-74 (1974), reports similar materials. However, these materials are not only unsatisfactory in respect of their retarding properties but also have a dark color and have an acrid odor which together greatly restrict their use for the intended purpose.

The substances suitable for delaying have already been described in the literature in the 1930s and 1940s and mentioned by various authors (Kruis and Spath, Benz, Harvey and Neville (cf. Kunze, R. A.; Thayer, A. G.; Gypsum and Plaster; Cem. Res. Prag. (1986), pp. 267-283). The processing window of a gypsum plaster extends from the commencement of stiffening (CS) to the end of stiffening (ES). The course of setting can be determined by means of the heat of hydration evolved (albeit indirectly and not precisely; see in Hans-Bertram Fischer, Martin Werner: Hydratationsverhalten von Gipsmischungen, Stuck, Putz, Trockenbau, 9194 pp. 16-22), and also by the Vicat method, DIN 1168 part 2 or by means of ultrasound measurements, in Con. Chem.—Journal, No. 4 3196.

Suitable setting retarders thus shift the commencement of stiffening to a later time or increase the time difference between ES and CS. Such retarders are, for example, colloid formers (cellulose ethers, casein, dextrin) or amphoteric inorganic compounds (zinc oxide and lead oxide) and in particular complexing agents for calcium or substances which form sparingly soluble compounds with calcium, e.g. phosphates, phosphonates, silicone fluorides, boric acid, borates, tartaric acid, gluconic acid, heptonic acid, citric acid, gallic acid, sucrose, glucose, fructose, malic acid. In the interests of reproducibility but especially for cost reasons, virtually only fruit acids have been used in practice as retarders. At present, mainly tartaric acid is used as setting retarder for gypsum plaster.

The gypsum plasters processed using tartaric acid typically display a flat setting curve and a large difference between ES and CS, which is very much in keeping with the requirements of the user. However, a disadvantage is the low retarding action in terms of CS compared to polymeric electrolytes. An obvious tartaric acid substitute, viz. citric acid, frequently gives setting faults when applied by machine and complaints resulting therefrom.

DE 199 14 367 discloses a water-resistant hydraulically setting composition containing amido betaines, ether carboxylic acids and alkyl betaines as auxiliaries. Gypsum plaster in the form of hemihydrate and anhydrite is also mentioned as hydraulically setting composition on page 4, line 55 ff.

DE 197 40 787 A1 discloses a method of improving the plasticity of ceramic compositions, but the abovementioned problems are likewise observed.

JP 08 169 741 A discloses the use of polysuccinimide in cement; however, here too an optimal time difference between CS-ES is not ensured.

WO 92/16463 A1 discloses a process for preventing the precipitation of calcium sulfate in aqueous systems when using polyaspartic acid. The use of polymeric recurring succinyl units for retarding the setting of calcium sulfate beta-hemihydrate or preparations containing this is possible in principle but results in a very short processing window.

It is known from Zement, Kalk and Gips International, No. 911999, that the dimeric compound imidodisuccinate or the sodium salt Na-IDS of the formula indicated there can be used as retarder for machine gypsum plasters. This compound has very good properties in respect of setting of the gypsum plaster. However, the use of this compound has the disadvantage that although it retards setting very well it has a very short processing window. The processing window is the time between commencement of setting and the end of setting. Only the addition of the known retarder tartaric acid in amounts of from 0.03 to 0.04% by weight to the imidodisuccinate enables this window to be broadened.

DESCRIPTION OF THE INVENTION

In the light of the disadvantages of the prior art, it was therefore an object of the present invention to provide a setting retarder for hydraulically setting compositions which in many hydraulically setting compositions allows optimal setting between commencement of stiffening and the end of stiffening. It was likewise an object of the present invention to provide an improved, simple process for preparing a setting retarder which enables the corresponding setting retarder to be obtained in high yields.

This object is achieved in respect of the setting retarder by the features of claim 1, in respect of the process for preparing the setting retarder by the features of claim 8. Claim 13 specifies possible uses of the setting retarder. The respective dependent claims define advantageous embodiments.

Ways of Carrying Out the Invention

According to the invention, a setting retarder for hydraulically setting compositions, which contains at least one at least single adduct and/or condensate which can be prepared by reaction of at least one protein hydrolyzate, a pure amino acid, amino acid mixtures and/or hydrochlorides thereof with at least one monocarboxylic, dicarboxylic, oligocarboxylic and/or polycarboxylic acid which is not derived from an amino acid and/or carboxylic acid derivatives derived therefrom, where the carboxylic acid derivative is selected from the group consisting of carboxylic anhydrides, carboxylic acid halides and active carboxylic esters, is provided. The setting retarder thus contains an abovementioned adduct as pure material or else a mixture of a plurality of adducts.

Single adducts can be, for example, the reaction product of an amino acid having an $NH_2$ function with 1 equivalent of an acid or a derivative as defined above, in which case an amide bond is formed. An analogous situation applies in the case of the further nucleophilic functions which occur in amino acids, e.g. —OH and —SH functions, in which case ester or thioester groups, respectively, are formed. The corresponding reaction of a protein hydrolyzate with an equivalent of an acid or derivative thereof is likewise possible. Multiple adducts, i.e. at least double, triple, quadruple, etc., adducts, are obtained when either an amino acid or a protein hydrolyzate having two or more nucleophilic functions, e.g. amino, hydroxy and/or thiol groups, is used and/or a polybasic carboxylic acid, i.e. a dicarboxylic, tricarboxylic, oligo-carboxylic acid, etc. is used.

The adducts and/or condensates can be present as pure substances or as a mixture in the setting retarders according to the invention. For the present purposes, mixtures mean that adducts of various materials (e.g. various amino acids and/or carboxylic acids) and/or single and multiple adducts of the same materials can be present in admixture with one another.

As protein hydrolyzates, it is possible to use, for example, hydrolyzates prepared by enzymatic degradation of protein and also chemically produced protein hydrolyzates, e.g. protein hydrolyzates prepared by hydrolysis.

Preference is given to the at least one amino acid being selected from the group consisting of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine and/or aminobutanoic acid. However, it is likewise possible to use the hydrochlorides of the abovementioned amino acids, for example lysine hydrochloride.

In the case of the acid component, preference is given to the monocarboxylic, dicarboxylic, oligocarboxylic and/or polycarboxylic acid and/or the carboxylic acid derivative being selected from the group consisting of oxalic acid, acetic acid, propionic acid, 1,3-propanedioic acid, butanoic acid, succinic acid, maleic acid, fumaric acid, phthalic acid, pyromellitic acid, malic acid, tartaric acid, citric acid and the acid halides, anhydrides and active esters of the compounds mentioned; succinic anhydride is particularly preferred here.

In a further advantageous embodiment, the adduct and/or condensate present in the setting retarder is characterized by the general formula I:

$$Z—Y—(R^3)_c—(CHR^1)_a—(CHR^2)_b—Y—Z \quad \text{Formula I}$$

where, in each case independently of one another, $R^1$ is hydrogen or a linear or branched $C_1$-$C_{12}$-alkyl radical,
$R^2$ is —COOX and/or —$SO_3$X, where X=H, Li, Na, K, ½Mg, ½Ca, ½Zn, $R^3$ is a divalent aromatic radical which is ortho-, meta- or para-substituted and has from 6 to 18 carbon atoms or a radical of the formula II Formula II where the imine carbon (—C═N) is bound to the group Y in the formula I,
a is from 1 to 12,
b is from 0 to 10,
c is 0 or 1,
Y is $NR^1$, S or O, where $R^1$ is as defined above, and
Z is —C(═O)—$(CHR^1)_d$—COOX, where $R^1$ and X are as defined above and d is from 0 to 12.

The compound of the formula I is therefore, for example, a double adduct of an amino acid having two amino functions and two equivalents of a carboxylic acid having two acid functions or an internal carboxylic anhydride.

Preference is likewise given to the setting retarder being present as a mixture of the above-described double adduct of the formula I with at least one single adduct having one of the formulae III and/or IV:

$$HY—(R^3)_c—(CHR^1)_a—(CHR^2)_b—Y—Z \quad \text{Formula III}$$

$$Z—Y—(R^3)_c—(CHR^1)_a—(CHR^2)_b—YH \quad \text{Formula IV}$$

where $R^1$, $R^2$, $R^3$, a, b, c, Y and Z are as defined above.

The single adducts and/or condensates of the formulae III and IV are thus each a reaction product, e.g. of an amino acid having two amino functions with one equivalent of a carboxylic acid having two carboxyl functions and/or an internal carboxylic anhydride.

In particular, good setting retarders are obtained when $R^1$=H; a=2-6, in particular 4; $R^2$=COOX; b=1; c=0; d=1-6, in particular 2, and Y=NH.

The setting retarder can be present in aqueous solution or in dry powder form. Preferred concentration ranges of the aqueous solution of the setting retarder are from 15 to 50% by weight, preferably from 15 to 40% by weight, particularly preferably from 30 to 40% by weight.

Advantageous pH values of the aqueous solution of the setting retarder are in the range from 2 to 13, preferably from 4 to 10, particularly preferably from 6 to 8.

In a further advantageous embodiment, the setting retarder can contain at least one additive selected from the group consisting of rheological auxiliaries, solvents, antifoams, accelerators, fillers, dryers, dyes, preservatives, rust inhibitors, hydrophobicizing agents and pigments, or a mixture of two or more additives selected from among these.

The proportion by weight of the at least one additive based on 100% by weight of setting retarder is preferably in the range from 0.1 to 30% by weight, preferably from 0.3 to 10% by weight.

The invention likewise provides a process for preparing a setting retarder as defined above, wherein
a) at least one protein hydrolyzate, a pure amino acid, an amino acid mixture and/or a hydrochloride thereof, preferably lysine, lysine hydrochloride and/or threonine, is mixed and reacted with
b) at least one monocarboxylic, dicarboxylic, oligocarboxylic and/or polycarboxylic acid which is not derived from an amino acid and/or carboxylic acid derivatives derived therefrom, where the carboxylic acid derivative is selected from the group consisting of carboxylic anhydrides, carboxylic acid halides and/or active carboxylic esters, preferably succinic anhydride,
in aqueous solution.

Preference is given here to adding at least one alkali, preferably sodium hydroxide, potassium hydroxide, milk of lime, slaked lime and/or quicklime, to the reaction mixture before, during and/or after mixing of the components a) and b).

In an advantageous embodiment of the process, the two starting materials a) and b) are used in an equivalence ratio of from 1:10 to 10:1, preferably from 1:3 to 3:1, where the equivalence of the starting material a) is based on free —$NH_2$ groups and the equivalence of the starting material b) is based on free or derivatized carboxyl functions.

After the reaction is complete, the product obtained can preferably be salted out by addition of at least one alkali, preferably an alkali selected from the group consisting of calcium hydroxide, calcium oxide, potassium hydroxide and sodium hydroxide.

According to the invention, the setting retarder is thus prepared in aqueous solution. After the reaction is complete, the aqueous solution of the setting retarder obtained can thus be used directly. However, it is likewise advantageous for the reaction mixture to be dried, preferably spray dried, after the reaction, resulting in the setting retarder being obtained either as a concentrated aqueous solution, as a paste or as dry powder.

When carrying out spray drying, preference is given to at least one spraying aid, preferably selected from the group consisting of ground limestone, lignosulfonate, talc, silica, polyacrylates and polyvinyl alcohols, being added before and/or during spray drying.

According to the invention, possible uses of the setting retarder are likewise specified. The setting retarder is suitable, in particular, for retarding the setting of a hydraulically setting composition, with the setting retarder being added to the hydraulically setting composition before, during and/or after mixing of the composition with water.

The hydraulically setting composition contains at least one inorganic substance which hardens after a particular period of time after mixing with water of hydration. In particular, the inorganic substance is selected from the group consisting of cement, hydraulic lime, gypsum plaster, gypsum-based plastering compositions, knifing fillers, mortars, screeds and mixtures thereof.

An important use of the setting retarder for gypsum plasters is, in particular, gypsum plasterboards.

Preference is given to adding from 0.001 to 0.5% by weight, preferably from 0.001 to 0.1% by weight, of the setting retarder (based on the dry weight of the setting retarder) to 100% by weight of the hydraulically setting composition (on a dry basis).

The preparation of a setting retarder to be preferred according to the invention is described by way of example below, with the description given being merely of an illustrative nature to explain the invention. The invention is not in any way to be interpreted as restricted to the specific parameters used in the following example.

Figure 1:
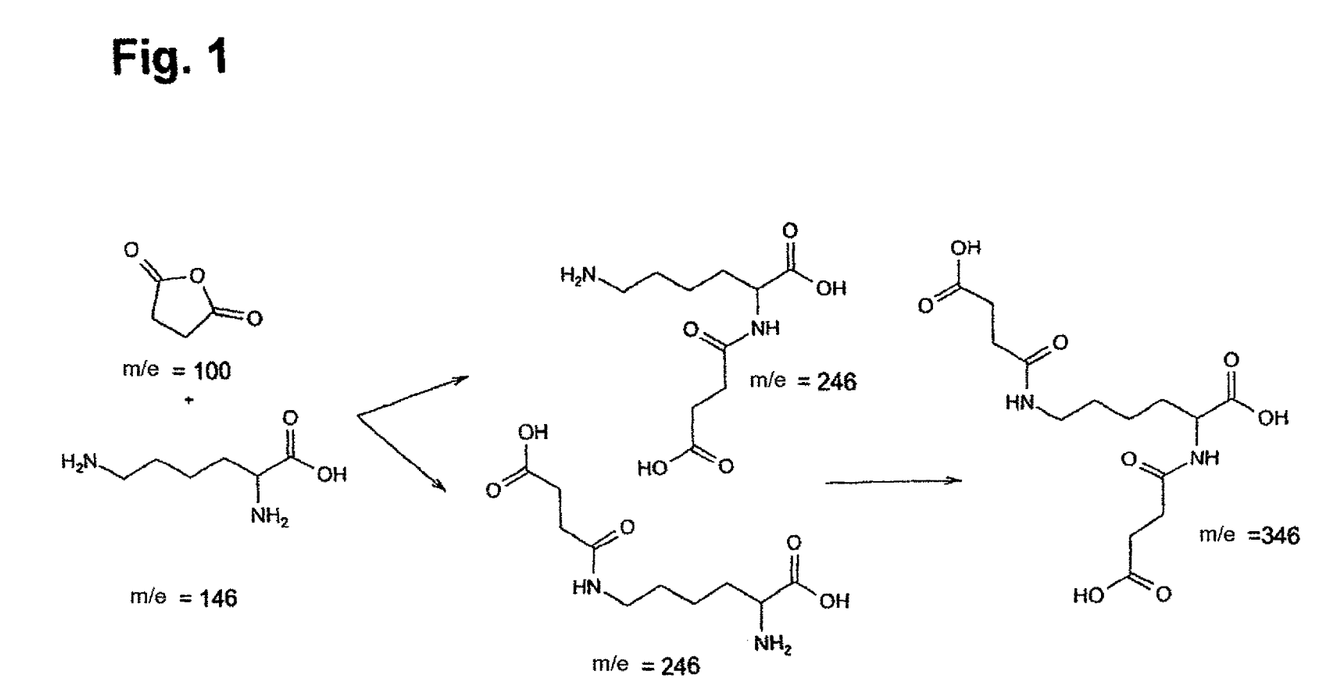
FIG. 1: the reaction scheme for the reaction of lysine with SAn with possible reaction products in the reaction.
Figure 2:
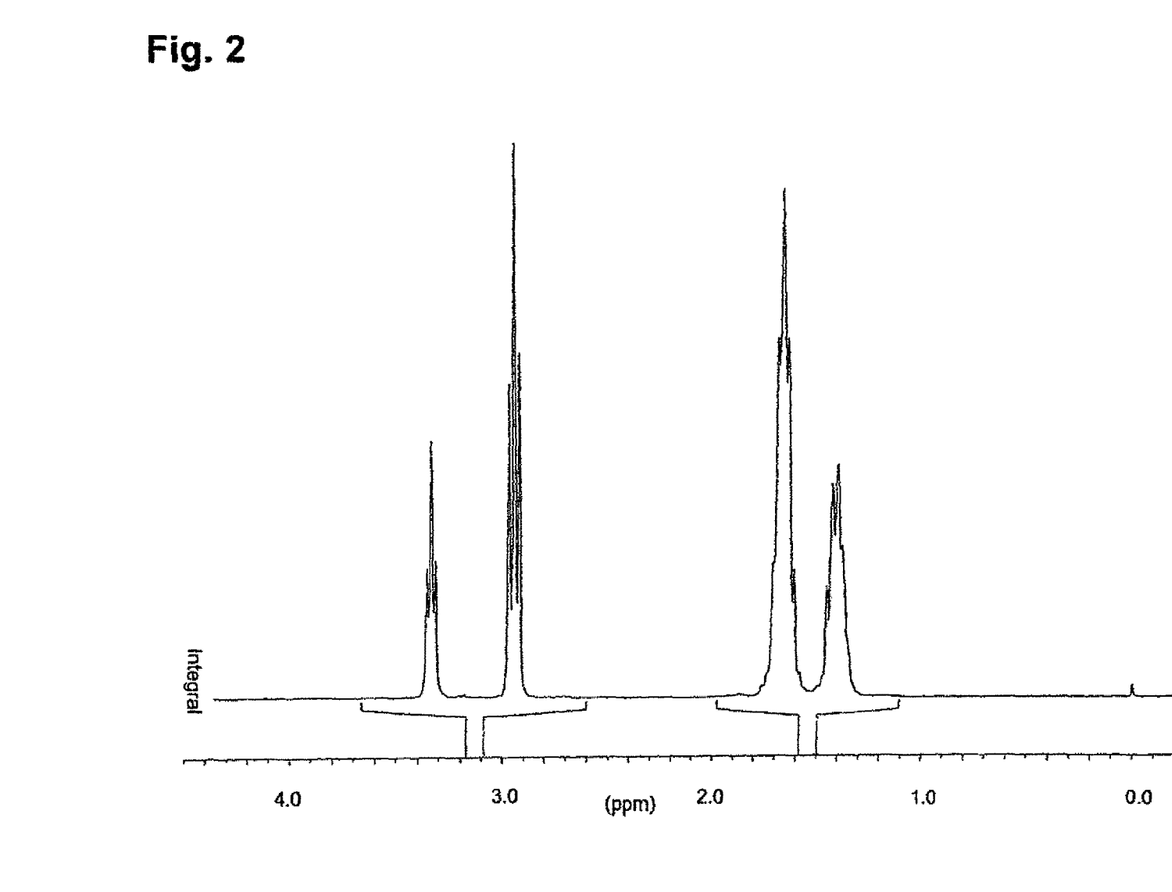
FIG. 2: the NMR spectrum of sample 1 (lysine)
Figure 3:
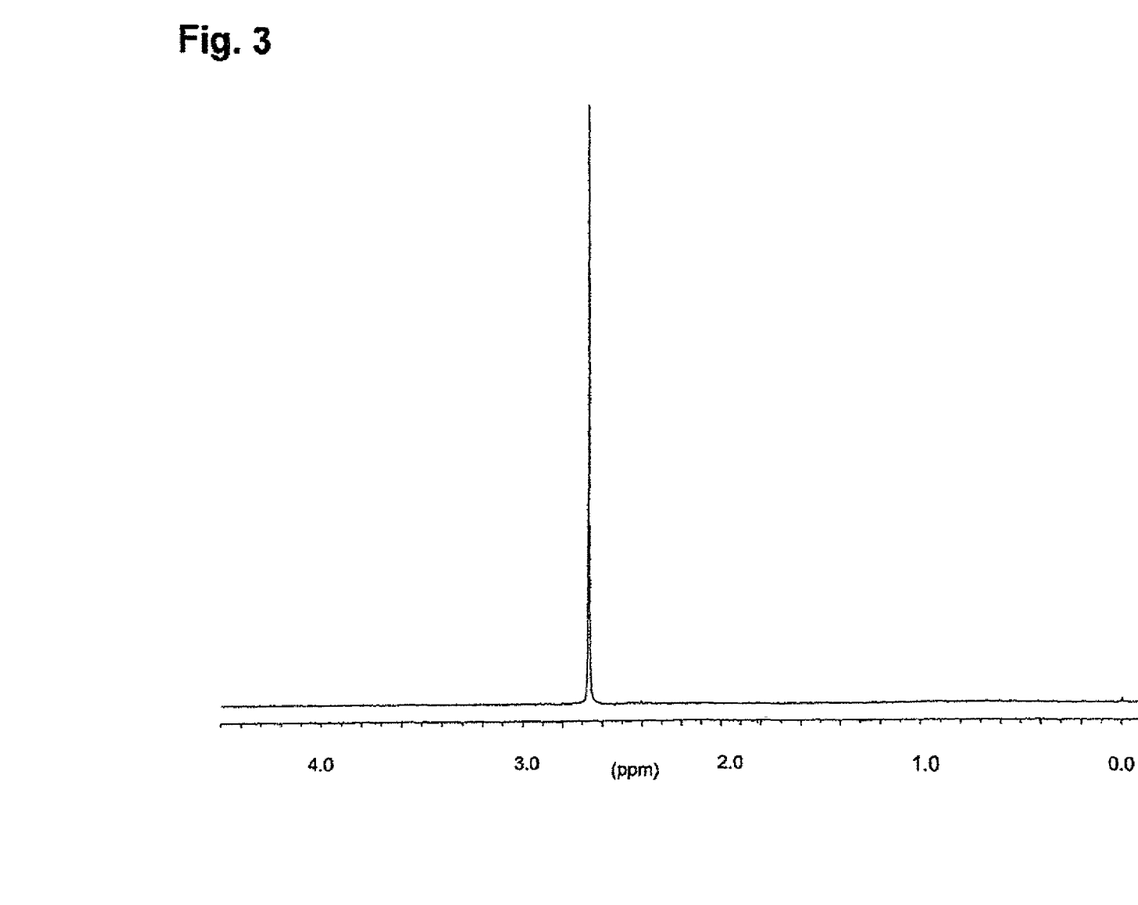
FIG. 3: the NMR spectrum of sample 2 (SAn)

The reaction shown in FIG. 1 leads to formation of various amides with elimination of water. The two amino groups of lysine react with 1 mol of succinic acid to form two isomeric molecules which are indistinguishable in the ESI mass spectrum but are distinguishable in the NMR spectra. Addition of 2 mol of succinic acid forms a further molecule. Starting compounds and the three reaction products are present in a mixture. The reaction can be controlled by use of an excess of succinic anhydride so that essentially only the double adduct is present. The synthesis of the setting retarders according to the invention can be carried out in many ways, as illustrated by the following preferred reaction sequences.

Preparative Process 1
1) Initial charging of water
2) Addition of an amino acid and/or protein hydrolyzate and/or amino acid mixture
3) Addition of acid anhydride (optionally gentle heating, e.g. to a temperature in the range from 30 to 80° C., or cooling if too much heat of neutralization is evolved)
4) Subsequent addition of preservative
The pH of the end product is from 2 to 13, preferably from 4 to 10, particularly preferably from 6 to 8 (neutralized with alkali)

Preparative Process 2
1) Initial charging of water
2) Addition of an alkali
3) Addition of an amino acid and/or protein hydrolyzate and/or amino acid mixture
4) Addition of acid anhydride (optionally gentle heating, e.g. to a temperature in the range from 30 to 80° C., or cooling if too much heat of neutralization is evolved)
5) Subsequent addition of preservative
The pH of the end product is from 2 to 13, preferably from 4 to 10, particularly preferably from 6 to 8 (neutralized with alkali)

Preparative Process 3
1) Initial charging of water
2) Addition of an amino acid and/or protein hydrolyzate and/or amino acid mixture
3) Addition of an alkali
4) Addition of acid anhydride (optionally gentle heating, e.g. to a temperature in the range from 30 to 80° C., or cooling if too much heat of neutralization is evolved)
5) Subsequent addition of preservative
The pH of the end product is from 2 to 13, preferably from 4 to 10, particularly preferably from 6 to 8 (neutralized with alkali)

Preparative Process 4
1) Initial charging of water
2) Addition of an amino acid and/or protein hydrolyzate and/or amino acid mixture
3) Addition of acid anhydride (optionally gentle heating, e.g. to a temperature in the range from 30 to 80° C., or cooling if too much heat of neutralization is evolved)
4) Addition of an alkali
5) Subsequent addition of preservative
The pH of the end product is from 2 to 13, preferably from 4 to 10, particularly preferably from 6 to 8 (neutralized with alkali)

Chemical Characterization

In the preparative process of the invention, a setting retarder (sample 3) was prepared by reacting lysine (sample 1) with succinic anhydride (SAn) (sample 2).

Figure 4:
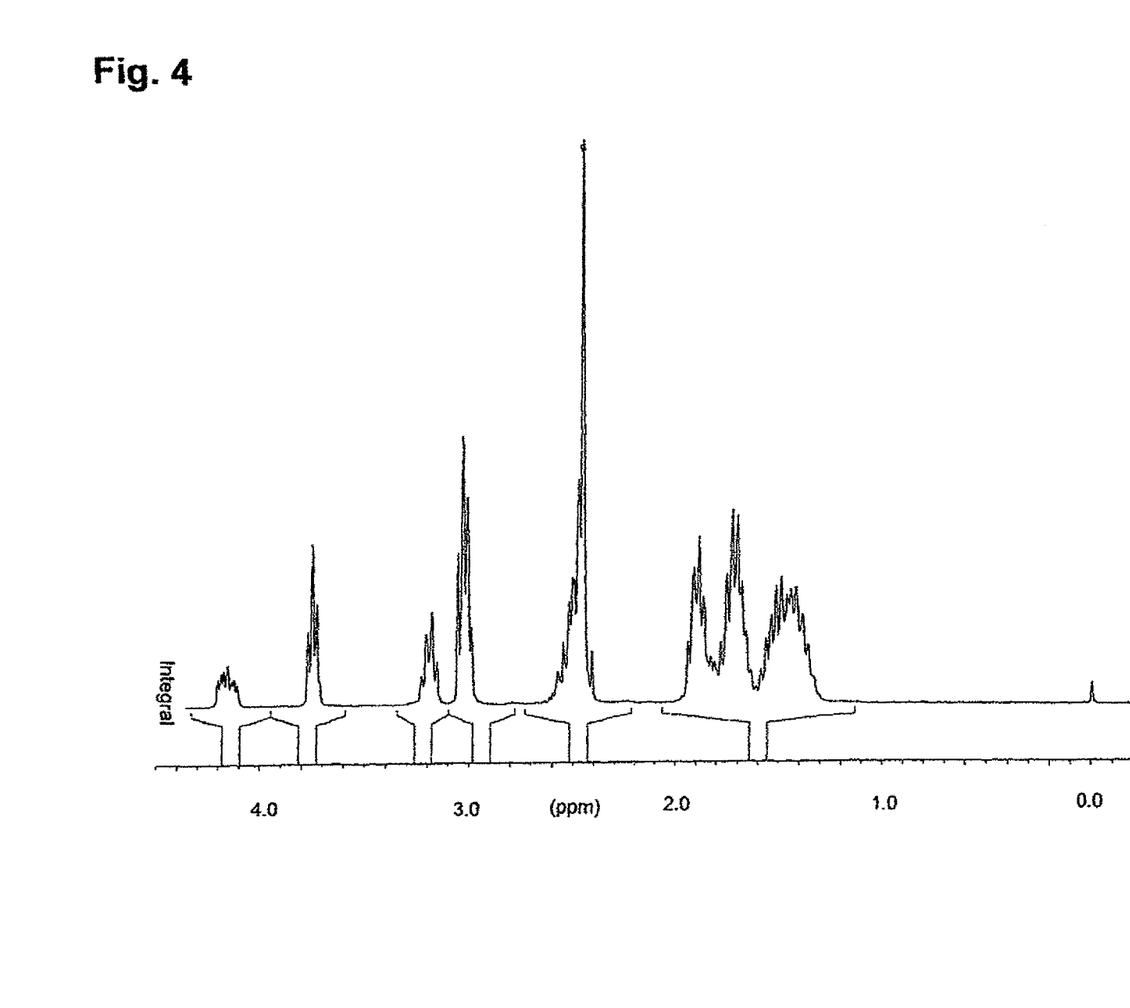
FIG. 4: the NMR spectrum of the reaction product (sample 3).
Figure 5:
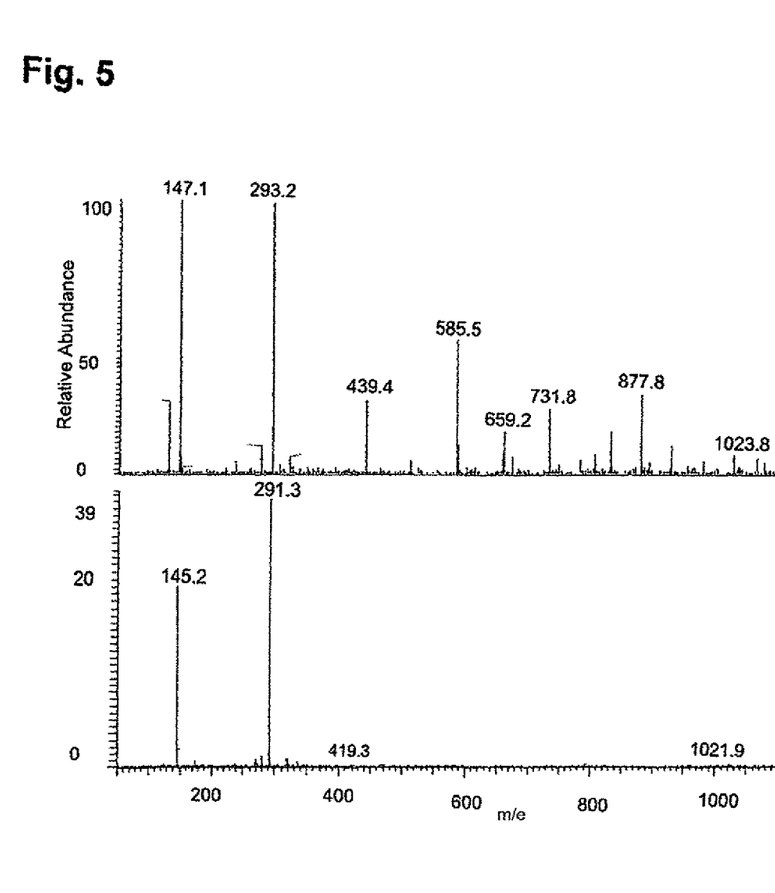
FIG. 5: a mass spectrum of sample 1 (lysine) with associated assignment of the peaks (table 1)
Figure 6:
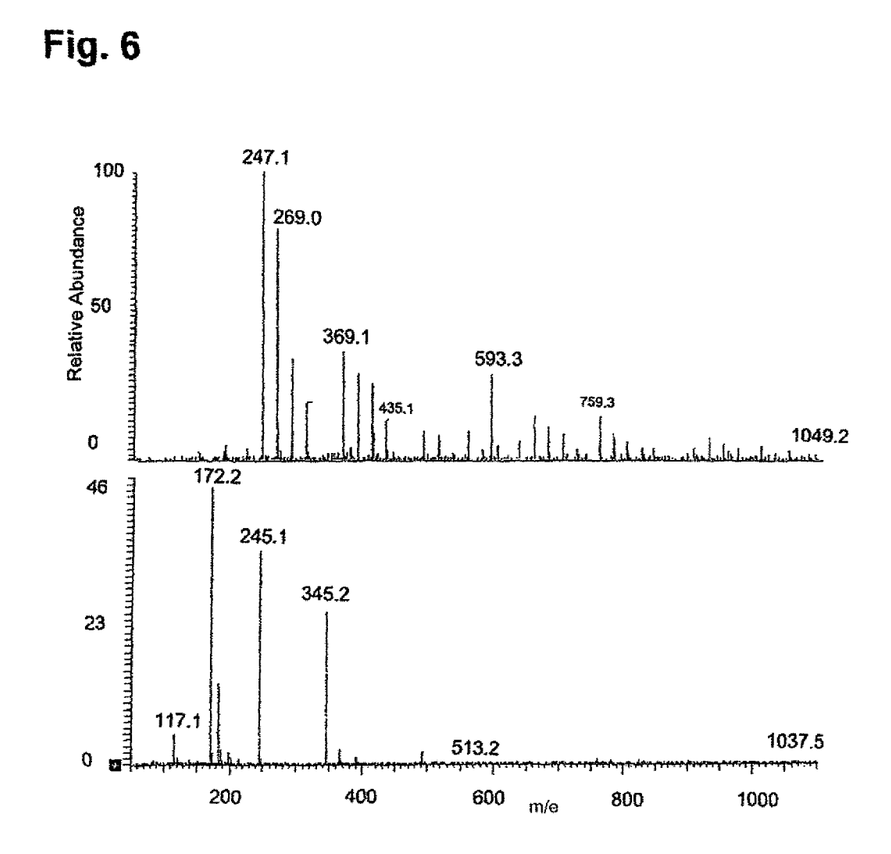
FIG. 6: a mass spectrum of the reaction product (sample 3) prepared in experiment 1 and also the associated assignment of the peaks (table 2).

The sample 3 examined is a chemical reaction product of lysine (50% strength by weight aqueous solution) and succinic anhydride (flakes), which were characterized as sample 1 and sample 2, respectively. Sample 3 was obtained by reaction of an aqueous, NaOH-neutralized solution (density at 20° C.=1.16 g/ml, pH: neutral) of 1.5 parts of starting material a) (based on amino acid lysine) and 1 part of starting material b) (based on succinic anhydride). The NMR spectrum of the reaction product is shown in FIG. 4.

1. Methods 3-(Trimethylsilyl)propionic acid-$d_4$ Na salt (TMSP; for NMR calibration) (Merck, Darmstadt) was used as reference or calibration substance for NMR calibration. Deuterium oxide having a degree of deuteration of 99.9% from Deutero GmbH, Kastellaun, was used as solvent for the NMR-spectroscopic analysis.

The NMR-spectroscopic analyses were carried out on an Avance 300 NMR spectrometer (BRUKER, Karlsruhe, Germany), magnetic flux density 7.05 tesla, PA BBI measuring head; autosampler BRUKER B-ACS 120; computer P IV 1.5 GHz using MS Windows 2000 Pro and BRUKER XWIN-NMR 3.5 for measurement; BRUKER Win-NMR 6.0 for evaluation.

The mass-spectroscopic analyses are carried out on a Finnigan AQA mass spectrometer (ThermoQuest, Manchester, GB) in the ±ESI mode, feed LC; HPLC Spectra-SYSTEM (ThermoFinnigan, San José, Calif.):

binary HPLC gradient pump P2000
degassing unit SCM1000
autosampler AS3000
UV detector UV2000 computer PIII 500 MHz using Windows NT 4.0 and software Xcalibur 1.2.

1.1 NMR Spectroscopy

To characterize the test samples, $^1$H-NMR spectra were measured. About 100 mg (samples 1 and 3) or about 20 mg (sample 2) were in each case dissolved in 1 ml of $D_2O$.

The NMR parameters used are marked on each spectrum. The figures show.

1.2 Mass Spectroscopy

To characterize the test samples 1 and 3, ±ESI mass spectra were measured. About 10 μl of the samples were dissolved in 1 ml of mobile phase and introduced via the LC/MS coupling. Mobile phase: methanol/formic acid (100:0.1)

scan parameters: 50-1100 amu in 2.9 sec. on capillary
applied voltage: 4 kV
source voltage: +50/–10 V
sample temperature: 300° C.

The attached mass spectra in FIGS. 5 and 6 show

2. Effect of the Setting Retarder

The effect of the setting retarder according to the invention was compared with the effect of commercial retarders (Retardan L and citric acid) in two formulations. The measurement was carried out from the commencement of stiffening on gypsum plaster slurry (water-gypsum plaster value 0.6, addition 0.01% by weight) using the knife method of DIN EN 13279-2:

blank: 15 minutes
Retardan L: 40 minutes (=commercial retarder, calcium salt of a polycondensed amino acid)
citric acid: 40 minutes
formulation 1 according to the invention: 90 minutes
formulation 2 according to the invention: 130 minutes Formulation 1: aqueous, NaOH-neutralized solution (density at 20° C.=1.16 g/ml, pH=5) of 1 part of starting material a) (based on amino acid threonine) and 1 part of starting material b) (based on succinic anhydride).

Formulation 2: aqueous, NaOH-neutralized solution (density at 20° C.=1.16 g/ml, pH: neutral) of 1 part of starting material a) (based on amino acid lysine) and 1.5 parts of starting material b) (based on succinic anhydride).

These comparative experiments clearly show the superior retarding properties of the setting retarder according to the invention. In both cases, a doubling or tripling of the setting time of the gypsum plaster could be achieved.

TABLE 1

| m/e | Signal assignment + ESI |
| --- | --- |
| 145 | $[M - H]^-$ |
| 147 | $[M + H]^+$ |
| 291 | $[2M - H]^-$ |
| 293 | $[2M + H]^+$ |
| 439 | $[3M + H]^+$ |
| 585 | $[4M + H]^+$ |
| 731 | $[5M + H]^+$ |

M = m/e 146: lysine

TABLE 2

| m/e | Signal assignment + ESI |
| --- | --- |
| 117 | $[M_3 - H]^-$ |
| 245 | $[M_1 - H]^-$ |
| 247 | $[M_1 + H]^+$ |
| 269 | $[M_1 + Na]^+$ |
| 291 | $[M_1 + 2Na - H]^+$ |
| 313 | $[M_1 + 3Na - 2H]^+$ |
| 345 | $[M_2 - H]^-$ |
| 369 | $[M_2 + Na]^+$ |
| 391 | $[M_2 + 2Na - H]^+$ |
| 413 | $[M_2 + 3Na - 2H]^+$ |
| 435 | $[M_2 + 4Na - 3H]^+$ |
| 593 | $[M_1 + M2 - H]^+$ |

$M_1$ = m/e 246: lysine + 1 × succinic anhydride
$M_2$ = m/e 346: lysine + 2 × succinic anhydride
$M_3$ = m/e 118: succinic acid

The invention claimed is:

1. A gypsum plaster composition containing, per 100% by weight of gypsum plaster as dry matter, from 0.001 to 0.5% by weight of a setting retarder, based on dry matter, wherein the setting retarder comprises:

at least one single adduct and/or condensate which can be prepared by reaction of at least one protein hydrolyzate, amino acid, amino acid mixtures, and/or hydrochlorides thereof with at least one monocarboxylic, dicarboxylic, oligocarboxylic, and/or polycarboxylic acid which is not derived from an amino acid and/or carboxylic acid derivatives derived therefrom, wherein the carboxylic acid derivative is selected from the group consisting of carboxylic anhydrides, carboxylic acid halides, and active carboxylic esters.

2. The gypsum plaster composition as claimed in claim 1, wherein the at least one amino acid is selected from the group consisting of alanine, arginine, asparagine, aspartic acid, cysteine, glutamine, glutamic acid, glycine, histidine, isoleucine, leucine, lysine, lysine hydrochloride, methionine, phenylalanine, proline, serine, threonine, tryptophan, tyrosine, valine, and aminobutanoic acid; and the monocarboxylic, dicarboxylic, oligocarboxylic and/or polycarboxylic acid and/or the carboxylic acid derivative is selected from the group consisting of oxalic acid, acetic acid, propionic acid, 1,3-propanedioic acid, butanoic acid, succinic acid, maleic acid, fumaric acid, phthalic acid, pyromellitic acid, malic acid, tartaric acid, citric acid and the acid halides, anhydrides, and active esters of the compounds mentioned.

3. The gypsum plaster composition as claimed in claim 1, wherein the at least one adduct and/or condensate has the general formula I:

Formula I where, in each case independently of one another, $R^1$ is hydrogen or a linear or branched $C_1$-$C_{12}$-alkyl radical,
$R^2$ is —COOX and/or —$SO_3$X, where, X=H, Li, Na, K, ½Mg, ½Ca, or ½Zn,
$R^3$ is a divalent aromatic radical that is ortho-, meta-, or para-substituted and has from 6 to 18 carbon atoms; a radical of the formula II:

Formula II where the imine carbon (—C=N) is bound to the group Y in the formula I,
a is from 1 to 12,
b is from 0 to 10,
is 0 or 1,
Y is $NR^1$, S or O, where $R^1$ is as defined above,
Z is —C(=O)—$(CHR^1)_d$—COOX, where $R^1$ and X are as defined above, and
d is from 0 to 12; and/or
a mixture containing the adduct and/or condensate of the general formula I and one or both adducts and/or condensates of the general formulae III and IV:

Formula III

Formula IV where $R^1$, $R^2$, $R^3$, a, b, c, Y, and Z are as defined above.

4. The gypsum plaster composition as claimed in claim 3, wherein $R^1$=H; a=2-6; $R^2$=COOX; b=1; c=0; d=1-6, and Y=NH.

5. The gypsum plaster composition as claimed in claim 1, wherein the setting retarder is present in aqueous solution or in dry powder form.

6. The gypsum plaster composition as claimed in claim 1, wherein a pH of the aqueous solution is in a range from 2 to 13.

7. The gypsum plaster composition as claimed in claim 1, wherein at least one additive selected from the group consisting of rheological auxiliaries, solvents, antifoams, accelerators, fillers, dryers, dyes, preservatives, rust inhibitors, hydrophobicizing agents and pigments, and a mixture of two or more additives selected from among these is present in the setting retarder.

8. A process for producing a gypsum plaster composition as claimed in claim 1, wherein the setting retarder is added before, during, and/or after mixing of the gypsum plaster composition with water.

9. The process as claimed in claim 8, wherein the setting retarder is prepared as follows:
a starting material (a) comprising at least one protein hydrolyzate, amino acid, an amino acid mixture, and/or a hydrochloride thereof is mixed and reacted with
a starting material (b) comprising at least one monocarboxylic, dicarboxylic, oligocarboxylic and/or polycarboxylic acid which is not derived from an amino acid and/or carboxylic acid derivatives derived therefrom,
wherein the carboxylic acid derivative is selected from the group consisting of carboxylic anhydrides, carboxylic acid halides, and/or active carboxylic esters, in aqueous solution.

10. The process as claimed in claim 9, wherein at least one alkali is added to the reaction mixture before, during, and/or after mixing of the starting materials (a) and (b).

11. The process as claimed in claim 9, wherein an equivalence ratio of the starting materials (a) and (b) is in a range from 1:10 to 10:1, where an equivalence of the starting material (a) is based on free —$NH_2$ groups and an equivalence of the starting material (b) is based on free or derivatized carboxyl functions.

12. The process as claimed in claim 8, wherein a product is precipitated after the reaction by an addition of at least one alkali.

13. The process as claimed in claim 8, wherein the reaction mixture is dried after the reaction.

14. The process as claimed in claim 8, wherein the gypsum plaster is selected from the group consisting of gypsum containing plastering compositions, fillers, mortars, screeds, and mixtures thereof.

15. The process as claimed in claim 8, wherein 0.001 to 0.5% by weight of the setting retarder is added per 100% by weight of gypsum plaster in dry form.

* * * * *